(12) United States Patent
Goeppert et al.

(10) Patent No.: US 8,151,966 B2
(45) Date of Patent: Apr. 10, 2012

(54) ARRANGEMENT FOR OPERATING A CLUTCH

(75) Inventors: Georg Goeppert, Hausach (DE); Olaf Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 942 days.

(21) Appl. No.: 11/901,116

(22) Filed: Sep. 13, 2007

(65) Prior Publication Data

US 2008/0067030 A1  Mar. 20, 2008

(30) Foreign Application Priority Data

Sep. 16, 2006  (DE) .......................... 10 2006 043 620

(51) Int. Cl.
*F16D 23/14* (2006.01)

(52) U.S. Cl. ....................................... 192/98; 192/89.23

(58) Field of Classification Search ............... 192/89.23, 192/89.22, 98
See application file for complete search history.

(56) References Cited

U.S. PATENT DOCUMENTS

| | | | | |
|---|---|---|---|---|
| 4,534,458 | A | * | 8/1985 | Ladin ............................. 192/98 |
| 5,544,543 | A | * | 8/1996 | Hilgert et al. ................. 74/502.4 |
| 5,758,756 | A | * | 6/1998 | Weiss et al. ............. 192/70.252 |
| 6,029,792 | A | * | 2/2000 | Beitler et al. ............ 192/70.252 |
| 2005/0087417 | A1 | * | 4/2005 | Shimomura et al. ............ 192/45 |
| 2006/0117901 | A1 | * | 6/2006 | Owyang .................. 74/501.5 R |

FOREIGN PATENT DOCUMENTS

| | | |
|---|---|---|
| DE | 103 13 435 | 10/2003 |
| DE | 103 16 445 | 10/2003 |

* cited by examiner

*Primary Examiner* — David D Le
*Assistant Examiner* — Ryan Dodd
(74) *Attorney, Agent, or Firm* — Simpson & Simpson, PLLC

(57) ABSTRACT

Arrangement for operating a clutch, in particular a clutch in the power train of a motor vehicle, comprising a means of transmission that is mounted movably in an operating direction with respect to a support. The support is flexibly mounted in the direction of operation with respect to a housing.

13 Claims, 3 Drawing Sheets

— 1 —
ARRANGEMENT FOR OPERATING A CLUTCH

CROSS REFERENCE TO RELATED APPLICATIONS

This patent claims priority of German Patent Application No. 10 2006 043 620.2, filed Sep. 16, 2006, which application is incorporated herein by reference.

FIELD OF THE INVENTION

The present invention relates to an arrangement for operating a clutch.

BACKGROUND OF THE INVENTION

An arrangement for operating a clutch is known for example from DE 10313435. Due to friction, in a rigid engagement system a dead zone always occurs; that is, when the direction of the actuator travel changes, this does not result in a change in the clutch travel, and hence no change in the torque of the clutch. Even when the dead zone is known, it is not possible to develop a robust regulating strategy that compensates for this behavior.

SUMMARY OF THE INVENTION

One object of the present invention is therefore to specify an arrangement for operating a clutch which has a smaller dead zone, or if possible none.

This problem is solved by an arrangement for operating a clutch, in particular a clutch in the power train of a motor vehicle, comprising a means of transmission that is mounted movably with respect to a support in an operating device, the support being mounted flexibly in the direction of operation with respect to a housing. Thus there is provision to dispose additional elasticity on the housing side of one or more friction points, so that the friction points are no longer situated rigidly against a support that is fixed to the housing, but are situated elastically with respect to the housing. The arrangement preferably includes means for shifting the means of transmission, in particular an actuator lever, as well as a means that is shifted by the means of transmission, preferably a lever spring that is operationally connected with the clutch. The means of transmission in a preferred embodiment is an engaging piston. The support for the means of transmission in a preferred embodiment is a guide tube. Preferably there is provision that the guide tube is elastically connected in the direction of operation by means of connectors to a base plate that is solidly affixed to the housing. The connectors preferably include springs that are connected to the guide tube and the base plate and may be under load in the tension and/or compression direction. The guide tube can be shifted elastically with respect to the base plate by means of the springs. The connectors preferably include pins that limit the relative shifting between guide tube and base plate, the pins preferably being threaded bolts which simultaneously form an axial guide and the stop.

BRIEF DESCRIPTION OF THE DRAWINGS

An exemplary embodiment of the invention will now be explained on the basis of the accompanying drawing. The figures show the following.

DETAILED DESCRIPTION OF THE INVENTION

Figure 1:
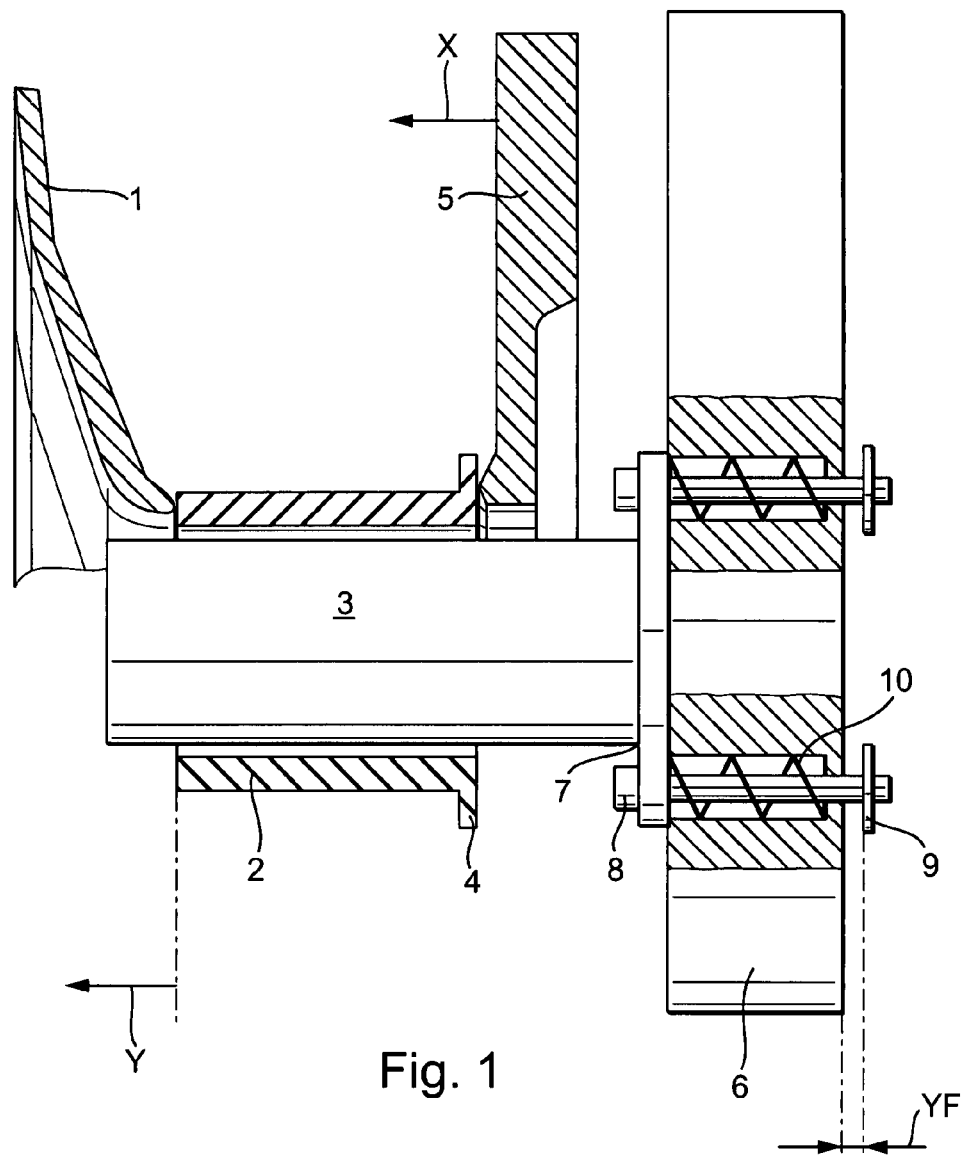
FIG. 1 is a schematic depiction of a lever system.

FIG. 1 shows a sketch of a disengaging system for a vehicle clutch in cross section. The system depicted is what is known as a lever disengager, as known inherently for example from DE 10313435. A corresponding clutch, not depicted here, is known for example from DE 10316445. Depicted in FIG. 1 in broad outline in cross section is lever spring 1 for operating the clutch (not depicted in further detail) in the power train of a motor vehicle between the combustion engine and the step-down gear. Lever spring 1 is operated in the direction of actuation path Y by means of an engaging piston 2, which is situated on a guide tube 3 so that it is movable in the direction of actuation path Y.

Engaging piston 2 has, on its side facing away from spring lever 1, washer 4 against which an actuator lever 5 presses to operate the clutch, not shown. When actuator lever 5 is operated, it moves engaging piston 2, and thus also lever spring 1, to operate the clutch, not shown here. During the actuation, engaging piston 2 slides on guide tube 3. In this sliding movement friction occurs, which has a proportion of so-called dry friction, independent of any lubrication and any especially smoothly designed surface of the sliding bodies. In dry friction it is first necessary to overcome static friction, as is known from physics, which requires a so-called breakaway force in order to initiate a sliding motion. The sliding friction which then sets in is weaker than the static friction. The result of this is that for a relative motion of engaging piston 2 with respect to guide tube 3 it is first necessary to produce the breakaway force.

It is now provided according to the invention for guide tube 3 no longer to be rigidly connected to a base plate 6, but rather for guide tube 3 to be mounted so that it is situated flexibly on base plate 6, movable in the direction of actuation path Y by a limited distance of movement YF. To that end the guide tube has an attaching flange 7 which is rigidly connected to guide tube 3, attaching flange 7 being flexibly connected to base plate 6, which is fixed with respect to a bell housing or transmission housing and thus is rigidly attached. The flexible connection between guide tube 3 or attaching flange 7 and base plate 6 is movable against a spring force by a distance YF in the direction of actuation path Y. The flexible connection may be designed for example in such a way that guide pins 8 are inserted into through holes through attaching flange 7 and base plate 6 and are provided with washers 9, so that in this case they may be moved by the distance YF. The guide pins 8 and the washers 9 may be screwed together by means of nuts. In addition, the through holes have non-continuous stepped bores, i.e., bores that are drilled in the manner of blind holes, in which springs 10 are situated. The springs are attached for example to base plate 6 and to attaching flange 7, for example by screwing or clamping, so that they act as tension and compression springs in the direction of actuation path Y. Alternatively, the springs may also be designed only as compression springs and may be situated alternatingly so that they are compressed in direction Y or contrary to direction Y. In all cases, guide tube 3 has free play against spring force both in direction Y and in the opposite direction.

Figure 2:
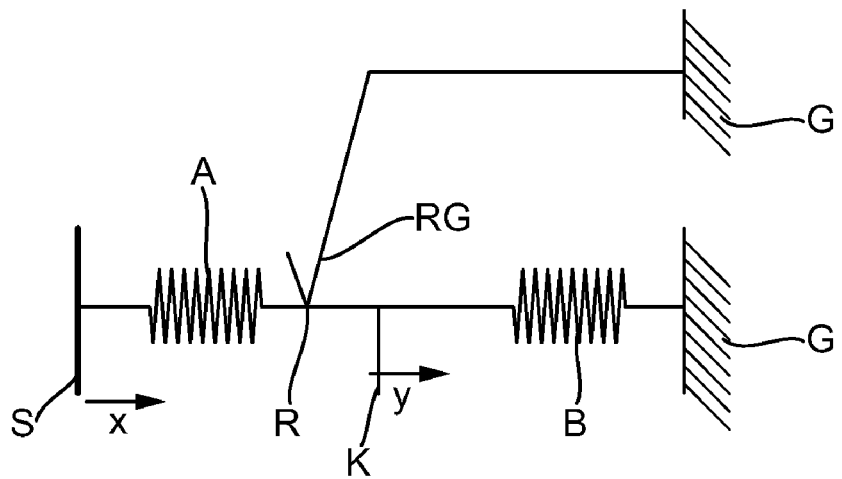
FIG. 2 is a mechanical equivalent diagram of a lever system according to the existing art.
Figure 3:
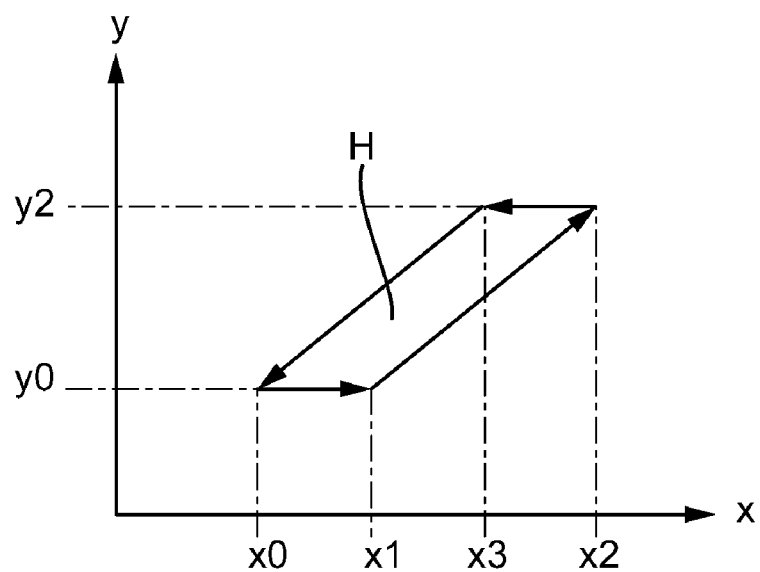
FIG. 3 is a hysteresis loop for the mechanical equivalent diagram according to FIG. 2.
Figure 4:
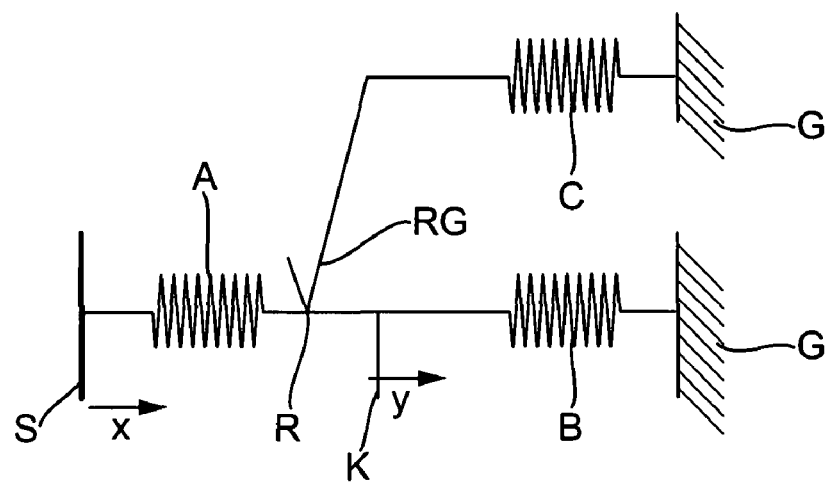
FIG. 4 is a mechanical equivalent diagram of a lever system according to the invention; and,
FIG. 5 is a hysteresis loop for the mechanical equivalent diagram according to FIG. 4.
Figure 5:
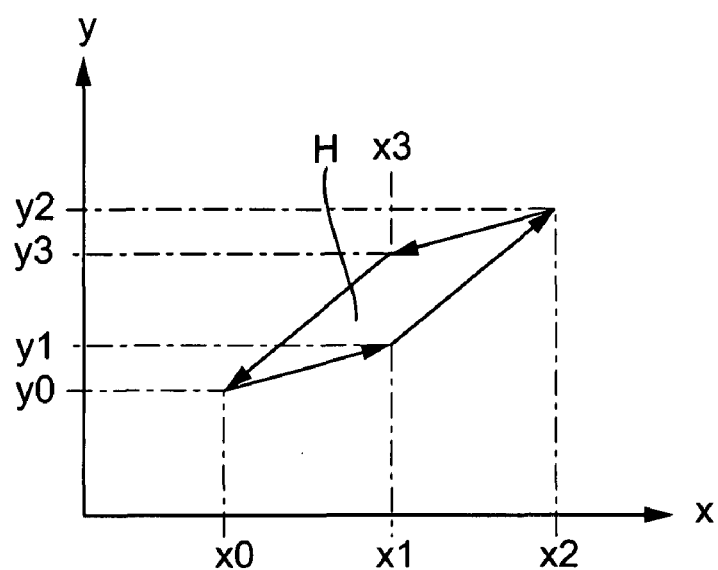

FIG. 2 shows a mechanical equivalent diagram of a lever system according to the existing art, i.e., without a movable guide tube 3 as in the exemplary embodiment in FIG. 1. In the equivalent diagram in FIG. 2 the elasticities of the transmission path comprising actuator lever 5, engaging piston 2 and lever spring 1 are divided schematically into two springs, a spring A which includes all elasticities of the actuator lever and of the actuator to operate it, such as an electric drive, gear elements and the like, and a spring B which includes all elasticities of lever spring 1 and additional elasticities of the clutch, which is not depicted. The movable support of engaging piston 2 on guide tube 3 is depicted as friction point R with dry friction, where friction point R includes a friction element RG which is fixed on the housing. All supports fixed on the housing are designated with G. Side S corresponds to the positioner path of an actuator depicted only schematically on the basis of positioner travel X for operating actuator lever 5; a point K indicated by a vertical line corresponds to the clutch travel Y in FIG. 1. When actuator (positioner) S moves by a distance X (actuator travel, positioner travel), first the dry friction at point R against the elasticity of spring A must be overcome, until a movement by a distance Y of engaging piston 2 and—less the intermediately situated elasticity—of the clutch occurs. This effect ensures that a hysteresis according to FIG. 3 occurs. Pairs of values X/Y in FIGS. 3 and 5 are always identified with the same index. In FIG. 3 the travel X of the positioner is plotted on the abscissa and the clutch travel Y is plotted on the ordinate. Because of the dry friction, starting from positioner travel X=X0 to X=X1 no travel Y is observable in the clutch; the clutch travel remains at a value Y0. Only starting from travel X1 does an increase of the positioner travel X have an effect on the clutch travel Y. The same is true when the positioner reaches a value X2 and when the direction of motion is reversed; the clutch travel Y initially remains constant here, and is reduced only after the positioner has traveled a certain distance. In order to reduce the latter, it is now proposed according to the invention that an additional elasticity C be situated in friction branch RG according to FIG. 2. Such a lever system is depicted in FIG. 4 as a mechanical equivalent diagram. One possible model for arranging this elasticity is the exemplary embodiment according to FIG. 1. Elasticity C, like elasticities A and B, is a flexible element. In the exemplary embodiment in FIG. 1 the elasticity C is the result of the flexible movability of guide tube 3 with respect to base plate 6, i.e., by the parallel connection of the springs 10. The possible shift distance YF between the two is designed so that the spring force of the springs 10 at a maximum shift of guide tube 3 with respect to base plate 6, i.e., at full utilization of the travel YF, would be greater than the static friction force between engaging piston 2 and guide tube 3. Before guide tube 3 touches base plate 6, i.e., before the maximum travel distance is utilized, the static friction between guide tube 3 and engaging piston 2 is overcome; and, FIG. 5 shows a diagram of positioning travel X over clutch travel Y corresponding to FIG. 3. The area enclosed by the hysteresis loop is smaller in the arrangement according to the invention than in the system according to the existing art. Furthermore, the parts of the loop in FIG. 3 according to the existing art that run parallel to the abscissa, from X0, Y0 to X1, Y0 and from X2, Y2 to X3, Y2, now run at a slope determined by the elasticity of spring C, from X0', Y0' to X1', Y1' and from X2', Y2' to X3', Y3'. Hence when there is a change in the actuator travel X, a change in the clutch travel Y now occurs at every point of the hysteresis loop; there are no areas of the hysteresis loop where the slope is zero.

Designations
1 lever spring
2 engaging piston
3 guide tube
4 washer
5 actuator lever
6 base plate
7 attaching flange
8 screw
9 nut
10 spring
X positioning travel of the actuator
Y operating travel of the clutch
YF travel distance

What is claimed is:

1. An arrangement for operating a clutch in the power train of a motor vehicle, comprising a means of transmission (2) that is mounted movably in an operating direction with respect to a support (3), wherein at least one friction point is formed directly between the means of transmission and a radially outwardly facing surface of the support with respect to movement of the means of transmission relative to the support in the operating direction, wherein the support is mounted flexibly in the operating direction with respect to a housing (6) wherein the support (3) is a guide tube (3), and wherein the guide tube (3) is elastically connected in the operating direction by means of connectors (8, 9, 10) to a base plate (6) that is solidly affixed to the housing.

2. The arrangement recited in claim 1, further comprising a means for moving the means of transmission (2) and a clutch component that is moved by the means of transmission (2).

3. The arrangement recited in claim 2, wherein the means of moving the means of transmission (2) is an actuator lever (5).

4. The arrangement recited in claim 2, wherein the clutch component that is moved by the means of transmission (2) is a lever spring (1) that is operationally connected with the clutch.

5. The arrangement recited in claim 2, wherein the means of transmission (2) is an engaging piston (2).

6. The arrangement recited in claim 1, wherein the connectors include springs (10) that are connected to the guide tube (3) and the base plate (6) which may be under load in the tension and/or compression direction.

7. The arrangement recited in claim 6, wherein the connectors include pins (8) that limit the relative movement between guide tube (3) and base plate (6).

8. The arrangement recited in claim 7, wherein the pins (8) are threaded bolts that simultaneously form an axial guide.

9. An arrangement for operating a clutch in a power train of a motor vehicle, comprising:
a guide tube; and
a piston for controlling operation of the clutch, wherein the piston is mounted movably in an operating direction such that the piston fully surrounds a portion of the guide tube;
wherein at least one friction point is formed directly between the piston and the guide tube with respect to movement of the piston in the operating direction along the guide tube, wherein the guide tube is mounted flexibly in the operating direction with respect to a housing, and wherein the guide tube is elastically connected in the operating direction by means of springs coiled about pins that extend through a base plate of the housing.

10. The arrangement recited in claim 9, further comprising:
an actuation lever for moving the piston by physically pressing against the piston; and,
a lever spring operationally connected to the clutch, wherein movement of the piston in the operating direction engages the lever spring for controlling the clutch.

11. The arrangement recited in claim 9, wherein the pins include washers that limit the relative movement between guide tube and base plate.

12. The arrangement recited in claim 9, wherein the pins are threaded bolts that simultaneously form an axial guide for the guide tube.

13. An arrangement for operating a clutch in a power train of a motor vehicle, comprising:
- a piston with a first through bore;
- an actuator lever with a second through bore, the actuator lever engaged with the piston and arranged to displace the piston;
- a guide tube, at least partially disposed in the first and second through bores and in frictional engagement with the piston;
- a flange in contact with the guide tube and axially fixed with respect to the guide tube;
- at least one spring in contact with the flange and with an end axially fixed with respect to the housing; and,
- a housing fixed with respect to the piston and the guide tube, wherein:
  - the guide tube is biased toward or away from the housing; and,
  - the piston is displaceable with respect to the guide tube for controlling operation of the clutch.

* * * * *